(12) United States Patent
de Cesare et al.

(10) Patent No.: US 8,332,559 B2
(45) Date of Patent: Dec. 11, 2012

(54) POWER MANAGED LOCK OPTIMIZATION

(75) Inventors: Josh P. de Cesare, Campbell, CA (US);
Ruchi Wadhawan, Saratoga, CA (US);
Michael J. Smith, San Francisco, CA (US); Puneet Kumar, Saratoga, CA (US); Bernard J. Semeria, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/413,796

(22) Filed: Mar. 7, 2012

(65) Prior Publication Data

US 2012/0167107 A1  Jun. 28, 2012

Related U.S. Application Data

(63) Continuation of application No. 12/465,182, filed on May 13, 2009, now Pat. No. 8,156,275.

(51) Int. Cl.
*G06F 13/00* (2006.01)
*G06F 1/32* (2006.01)

(52) U.S. Cl. .................. 710/200; 713/320; 718/104

(58) Field of Classification Search ............ 713/320, 713/323, 324; 718/100, 102, 104, 106; 710/200
See application file for complete search history.

(56) References Cited

U.S. PATENT DOCUMENTS

| | | | |
|---|---|---|---|
| 5,974,560 A | 10/1999 | Hotta et al. | |
| 7,249,270 B2 * | 7/2007 | Mansell et al. | 713/320 |
| 7,257,679 B2 * | 8/2007 | Clark | 711/141 |
| 7,500,037 B2 | 3/2009 | Adams | |
| 7,882,379 B2 * | 2/2011 | Kanakogi | 713/322 |
| 8,020,166 B2 * | 9/2011 | Ruemmler | 718/104 |
| 8,156,275 B2 | 4/2012 | de Cesare et al. | |

(Continued)

FOREIGN PATENT DOCUMENTS

KR  10-2006-0048630  5/2006

OTHER PUBLICATIONS

International Search Report from PCT/US 10/34050 mailed on Jun. 24, 2010, 9 pages.

(Continued)

*Primary Examiner* — Glenn A Auve
(74) *Attorney, Agent, or Firm* — Lawrence J. Merkel; Meyertons, Hood, Kivlin, Kowert & Goetzel, P.C.

(57) ABSTRACT

In an embodiment, a timer unit may be provided that may be programmed to a selected time interval, or wakeup interval. A processor may execute a wait for event instruction, and enter a low power state for the thread that includes the instruction. The timer unit may signal a timer event at the expiration of the wakeup interval, and the processor may exit the low power state in response to the timer event. The thread may continue executing with the instruction following the wait for event instruction. In an embodiment, the processor/timer unit may be used to implement a power-managed lock acquisition mechanism, in which the processor is awakened a number of times to check the lock and execute the wait for event instruction if the lock is not free, after which the thread may block until the lock is free.

20 Claims, 9 Drawing Sheets

U.S. PATENT DOCUMENTS

| | | | |
|---|---|---|---|
| 2002/0004810 A1* | 1/2002 | Reneris | 709/104 |
| 2005/0246506 A1 | 11/2005 | Ukai | |
| 2006/0005197 A1* | 1/2006 | Saha et al. | 718/104 |
| 2006/0117316 A1 | 6/2006 | Cismas et al. | |
| 2007/0050527 A1 | 3/2007 | Tuan | |
| 2008/0168201 A1 | 7/2008 | de Cesare et al. | |
| 2008/0256547 A1 | 10/2008 | Brahmavar | |

OTHER PUBLICATIONS

Intel, "Prescott New Instructions Software Developers Guide," Jun. 2003.

ARM, "ARM Architecture Reference Manual ARM v7-A and ARM v7-R edition," Copyright 1996-1998, 2000, 2004-2007, ARM Limited.

Notice of Preliminary Rejection of Korean Patent Application No. 10-2010-45127, dated Oct. 26, 2011, Korean Intellectual Property Office, 6 pages.

English Translation of Notice of Preliminary Rejection of Korean Patent Application No. 10-2010-45127, dated Oct. 26, 2011, 4 pages.

English Translation of Korean Pub. No. 10-2006-0048630; US Pub No. 2006-005197, published Jan. 5, 2006, 17 pages.

* cited by examiner

POWER MANAGED LOCK OPTIMIZATION

This application is a continuation application of U.S. patent application Ser. No. 12/465,182, filed May 13, 2009, now U.S. Pat. No. 8,156,275.

BACKGROUND

1. Field of the Invention

This invention is related to the field of processors and systems that implement processors, and more particularly to managing locks in systems that include processors.

2. Description of the Related Art

In systems in which multiple threads can be concurrently active, the threads can access the same resource (such as a memory location, a data structure in memory, a device in the system, etc.). To ensure that access to a shared resource is performed in a logically controlled fashion, the shared resource can be protected by a lock. The locks can be used in multiprocessor systems, for example, to prevent overlapping access to the resource by threads executing on different processors. In a multi-threaded system, even if there is only one processor, overlapping access can occur among the multiple active threads if one thread is scheduled while another thread is in the process of accessing/updating the resource.

In order to access the resource or update the resource when a lock is protecting the resource, an accessing thread can acquire the lock, perform the desired accesses/updates, and release the lock. Other threads cannot acquire the lock while the current thread holds the lock. For some locks (generally referred to as "spin locks"), the threads that cannot acquire the lock enter a loop to continuously access the lock until a release is detected (often referred to as "spinning on the lock"). The loop can be very tight, typically including just a few instructions to read the lock and test it for the ability to be acquired. Accordingly, the loop and the corresponding data accesses tend to hit in the caches of the processor. The processor may thus burn significant power waiting for the spin lock to be released, while essentially not accomplishing useful work. Another type of lock is referred to as a "mutex lock." With a mutex lock, a thread attempts to acquire the lock and, if the attempt fails, the thread blocks so that the processor can do other work while the thread waits for the lock to be released.

In many cases, particularly in multi-processor systems, a thread frequently holds a mutex lock for a fairly short time period. The period of time can be less than the amount of time needed to schedule another thread in place of the blocked thread that is attempting to acquire the lock, for example. Accordingly, an optimization for mutex locks is to enter a spin loop on the lock for an amount of time approximately equal to the typical holding period, or perhaps a little longer. If the lock is released while the thread is still in the spin loop, it may acquire the lock and avoid the overhead of descheduling the thread and rescheduling the thread at a later point. While the thread is in the spin loop, the processor may again consume significant power.

Another mechanism implemented in some systems includes the use of a wait for event instruction and a send event instruction. The wait for event instruction can be used to cause a processor executing a thread to enter a low power state. The processor waits in the low power state for the execution of a send event instruction in another processor (e.g. the processor that is holding the lock), which transmits a send event message. In response to receiving the send event message, the processor returns to the higher power state to attempt to acquire the lock.

SUMMARY

In an embodiment, a timer unit may be provided that may be programmed to a selected time interval, or wakeup interval. A processor may execute a wait for event instruction, and enter a low power state for the thread that includes the instruction. The timer unit may signal a timer event at the expiration of the wakeup interval, and the processor may exit the low power state in response to the timer event. The thread may continue executing with the instruction following the wait for event instruction.

In an embodiment, the timer and the wait for event instruction may be used to implement a power managed optimization for acquiring a mutex lock. The wakeup interval may be determined based on the typical expected time that a thread will hold the lock. For example, the typical lock hold time may be a multiple of the wakeup interval (or approximately a multiple), such that a maximum number of iterations of attempting to acquire the lock, failing, and executing the wait for event instruction may be determined. The maximum number of iterations multiplied by the wakeup interval may be approximately the typical lock hold time (or somewhat greater than the typical lock hold time). Thus, if the lock is released within the typical lock hold time, the thread attempting to acquire the lock may not yet have blocked. If the lock is not released within the typical lock hold time, the thread may block and the processor resources assigned to the thread may be put to other productive use.

BRIEF DESCRIPTION OF THE DRAWINGS

The following detailed description makes reference to the accompanying drawings, which are now briefly described.

Figure 1:
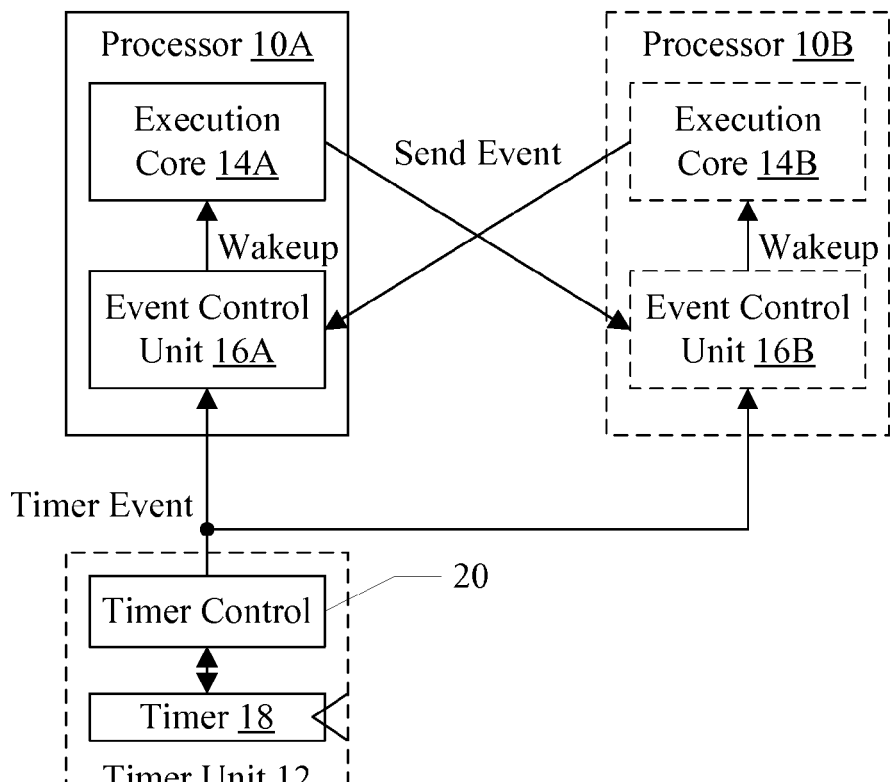
FIG. 1 is a block diagram of one embodiment of a portion of a system including one or more processors and a timer unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits to implement the operation. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram is shown of one embodiment of a processor 10A, an optional additional processor 10B, and a timer unit 12. The processors 10A-10B are coupled to receive a timer event signal from the timer unit 12. In the illustrated embodiment, the processor 10A includes an execution core 14A coupled to an event control unit 16A, which is coupled to receive the timer event signal. The processor 10B may similarly include an execution core 14B coupled to an event control unit 16B, which is coupled to receive the timer event signal. The execution cores 14A-14B may also be configured to transmit send event messages, which may be received by the event control units 16A-16B in the other processor 10A-10B, as shown in FIG. 1. In the illustrated embodiment, the timer unit 12 includes a timer 18 and a timer control unit 20 coupled to the timer 12.

The processors 10A-10B may be configured to execute instructions defined in an instruction set architecture (ISA) that is implemented by the processors. Generally, the ISA may specify the instructions, their operation, their coding, etc. Thus, a programmer or compiler may provide instructions as specified in the ISA, and the processors 10A-10B may execute the instructions and produce the specified operation as a result.

Specifically, in the embodiment of FIG. 1, the execution cores 14A-14B may be configured to execute the instructions in the ISA. Thus, the execution cores 14A-14B may include circuitry to fetch, decode, execute, and commit the result of each instruction. The execution cores 14A-14B may implement any microarchitecture, including superscalar and/or superpipelined microarchitectures, in-order execution or out-of-order execution; speculative execution, single threaded or multi-threaded execution, etc. In various embodiments, the execution cores 14A-14B may implement microcoding techniques in addition to any of the above implementations.

The ISA may include a wait for event instruction. Generally, the wait for event instruction may be defined in the ISA to cause the processor 10A-10B to enter a low power state, at least for the thread that includes the instruction. For example, the execution core 14A-14B as a whole may enter the low power state, in processors that do not dynamically switch between threads. Alternatively, in embodiments that support multiple threads, the resources that are dedicated to the thread that includes the instruction may enter the low power state. Resources dedicated to other threads may remain in a normal (not low) power state, and shared resources may selectively enter the low power state (e.g. entering the low power state if they are not in use by the other threads that are still active).

Generally, the low power state may be a state in which less power is expected to be consumed than the normal state of the processor. Different implementations may define the low power state in different ways. For example, clocks may be "turned off" (held in a steady state) to the resources entering the low power state. Dynamic power consumption may be reduced since the clocks are not toggling and thus state is not changing. Alternatively or in addition, the resources (or a subset of the resources) may be powered off. In one embodiment, memory devices such as arrays may remain powered to retain state while other circuitry is powered off. Powering circuitry off may reduce static power consumption (e.g. leakage current). Alternatively, or in addition, the processor may reduce its operating frequency and operating voltage to enter a low power state. Performance may be exchanged for power savings in such embodiments.

By providing the timer unit 12 and selecting the selected time interval for the timer unit 12 based on the typical expected time that a thread will hold a lock, such as a mutex lock, a relatively low power implementation of attempting to acquire the mutex lock for a period of time approximately equal to the typical lock hold time before blocking the thread may be achieved. For example, the selected time interval may be approximately the typical lock hold time divided by a small integer. The integer may be the number of iterations of attempting to acquire the lock, and executing the wait for event instruction in response to failing to acquire the lock, that will be executed before blocking the thread. For example, in one embodiment, the selected time interval may be about 1 microsecond, and the typical hold time may be about 10 microseconds or less. So, the number of iterations may be about 10 in this example. Typical lock hold time, selected time interval, and/or number of iterations may be higher or lower in other examples.

The event control units 16A-16B may be provided to detect events that will cause the processors 10A-10B to exit the low power state (or "wakeup"). Accordingly, the event control units 16A-16B may remain in operation when the corresponding processor 10A-10B enters the low power state. The event control units 16A-16B may be coupled to receive the timer event signal from the timer unit 12, which may indicate when the selected time interval has expired. The event control units 16A-16B may be configured to assert a wakeup signal to the execution cores 14A-14B, respectively, in response to the timer event signal and other events that are defined to cause the processor to exit the low power state. In response to waking up, the processor may continue execution of the thread that includes the wait for event instruction, at the instruction following the wait for event instruction. In some cases (e.g. if an interrupt is signalled), the thread may vector to a different instruction, but wakeup due to expiration of the selected time interval or the send event message (described below) may generally cause execution to return to the instruction following the wait for event instruction.

In one embodiment, another instruction in the ISA may be a send event instruction. The send event instruction may be defined to cause a send event message to be transmitted to other processors in the system. A processor that receives the send event message may wakeup from a previous wait for event instruction. Accordingly, the event control units 16A-16B are coupled to receive send event messages from the processors 10B-10A, respectively, as illustrated in FIG. 1. More particularly, the execution cores 14A-14B may transmit the send event messages. The form of the send event messages and the mechanism for communicating the messages is implementation dependent and may vary. For example, the processors 10A-10B may be coupled to a bus structure, and the send event message may be a bus transaction. Alternatively, the processors 10A-10B may be coupled to a packet-based interconnect, and the send event message may be a packet broadcast on the packet interconnect. In another example, the processors 10A-10B maybe cores implemented in a system-on-a-chip or multi-core chip, in which case the send event message may be a signal or a private interface between cores. The send event message may be any communication between processors that is defined to cause a receiving processor to wakeup.

The timer unit 12 may generally comprise circuitry that is configured to time a selected time interval, and provide an output that indicates that the selected time interval has expired. The timer unit 12 also begins timing the next interval upon expiration of the current interval, and thus the output of the timer unit 12 may periodically indicate that another interval has expired. In one embodiment, the timer unit 12 may pulse the timer event signal in response to the expiration. The pulse width may be one or more clock cycles, to ensure that it is properly received at each processor 10A-10B.

As illustrated in FIG. 1, the timer unit 12 may include a timer 18, which may increment or decrement in response to a clock input. For example, the timer 18 may be initialized to a value and may decrement each clock cycle of the clock input until the value reaches zero. The timer control unit 20 may detect the zero and signal the timer event. Additionally, the timer control unit 20 may reinitialize the timer to the value. Alternatively, the counter may be initialized to zero and may increment each clock cycle of the clock input. The timer control unit 20 may compare the timer value to the desired value to signal the timer event and to clear the timer 18 to zero.

Accordingly, the timer unit 12 may signal time intervals at the granularity of the input clock. To time a selected time interval, the timer unit 12 may be set to a value which, when multiplied by the clock period, equals or approximates the desired amount of time. The clock for the timer unit 12 may have any period/frequency. For example, clocks having frequencies in the range of tens of kilohertz may be used.

In one embodiment, the timer unit 12 may be programmable with the selected time interval. The timer control unit 20 may be configured to receive a communication from the processors 10A-10B to write the selected time interval to the timer unit 12 (or the value that represents the selected time interval in terms of clock periods of the input clock to the timer 18), and may be configured to update the timer 18 and/or another register with the value in response to the communication.

The wait for event instruction may be defined in different fashions in various ISAs, and may optionally include additional operation to that described above. For example, the wait for event instruction may be similar to the WFE instruction in the ARM ISA. The WFE instruction waits for the reception of a send event message from another processor to exit. In one embodiment, the processors 10A-10B may also detect the expiration of a selected time interval as an event to exit the low power state. The timer unit 12 may assert the timer event signal at the expiration each selected time interval, and may begin timing the next iteration of the selected time interval.

As another example, the wait for event instruction may be similar to the MWAIT instruction in the x86 ISA from Intel Corporation (also known as Intel Architecture (IA)-32). The MWAIT instruction is preceded by a MONITOR instruction that identifies a cache line to be monitored (e.g. a cache line containing the lock). The MWAIT instruction causes the processor to enter a low power state, and is awakened by a coherency hit on the monitored cache line. The wait for event instruction may be similar to the MWAIT instruction, but also exits the low power state in response to the expiration of the selected time interval. Alternatively, a separate instruction from the MWAIT instruction may be defined for the x86 ISA that may be used as the wait for event instruction. Other ISAs may also implement the wait for event instruction. Examples may include the Power ISA, the MIPS ISA, the SPARC ISA, etc.

For the remainder of this disclosure, the acronym WFE may be used to refer to the wait for event instruction, in the text and/or in the drawings. This acronym is not intended to limit the wait for event instruction to the WFE instruction defined in the ARM ISA, but rather refers to any wait for event instruction in any ISA that has the properties described above.

It is noted that, while FIG. 1 illustrates two processors 10A-10B, there may be more than two processors 10A-10B. Additionally, the processor 10B is optional and there may be only one processor in other embodiments. In embodiments having more than two processors, there may be more than one timer unit 12, and non-overlapping subsets of the processors may share different ones of the timer units. Alternatively, each processor may have its own timer unit 12.

It is noted that, in various embodiments, the processors 10A-10B may be discrete integrated circuits, or may be integrated as processor cores on a multicore integrated circuit or a system on a chip (SOC) integrated circuit. The timer unit 12 may be integrated on the multicore or SOC integrated circuit as well. Accordingly, as used herein, a processor may include a discrete integrated circuit and a processor core on an integrated circuit with other components and/or processor cores.

Figure 2:
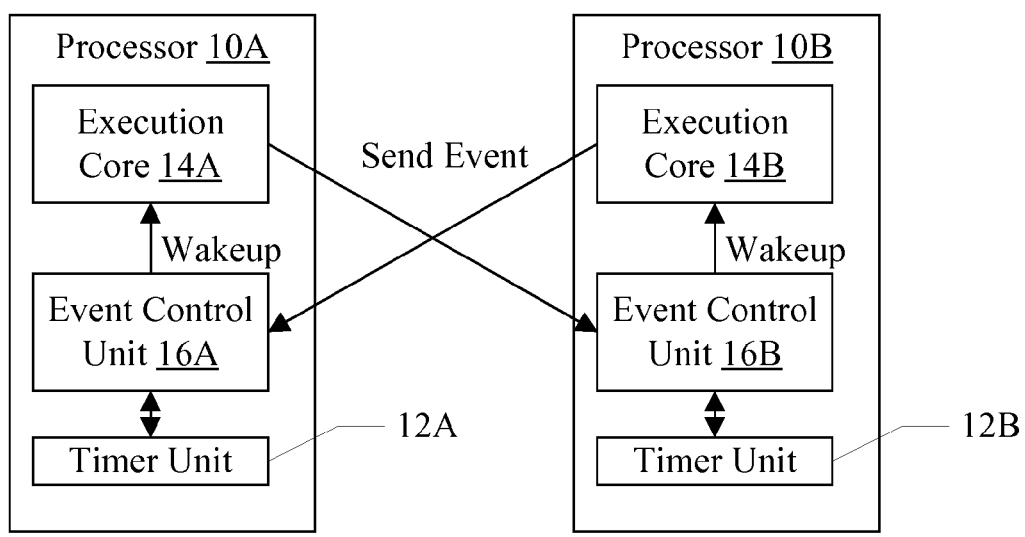
FIG. 2 is a block diagram of another embodiment of a portion of a system including one or more processors and a timer unit.

FIG. 2 is a block diagram another embodiment in which there is a timer unit 12A-12B for each individual processor 10A-10B, and the timer unit 12A-12B may be integrated into the processor 10A-10B. Some or all of the functionality of the timer control unit 20 may be integrated into the event control units 16A-16B, as desired.

Figure 3:
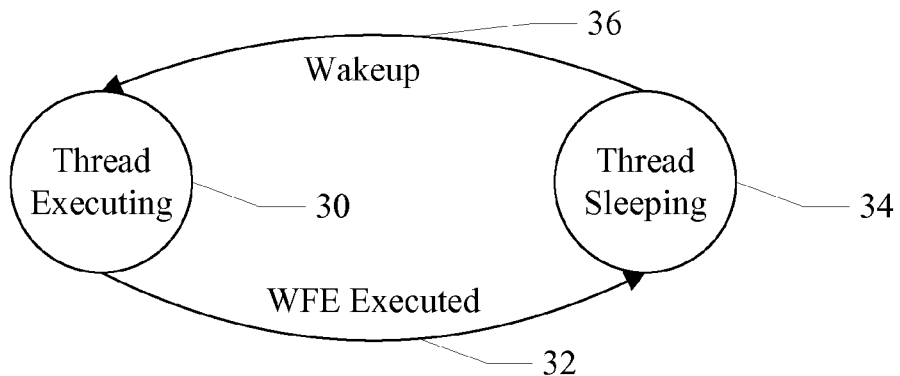
FIG. 3 is a state machine illustrating operation of one embodiment of an execution core shown in FIG. 1 or 2.

Turning now to FIG. 3, a state machine diagram is shown illustrating operation of one embodiment of a processor (e.g. the processor 10A or 10B) and more particularly an execution core (e.g. the execution core 14A or 14B) with regard to wait for event instructions.

If no wait for event instruction has been executed, the processor may be in the thread executing state 30. The thread executing state 30 may be a normal operating state. For example, a thread executing state may be a state in which the processor is executing at full power/performance or at a power/performance level selected by software for reasons other than the wait for event instruction. For example, based on the workload that the processor is experiencing software may select a suitable power/performance level (using lower power when lower performance is sufficient). In another example, software may select a power/performance level based on remaining battery life. Any factors may be considered, in various embodiments.

In response to the execution of a wait for event instruction (arc 32), the processor/execution core may enter a low power state for the thread, such as the thread sleeping state 34. In the thread sleeping state 34, the resources assigned to the thread that includes the wait for event instruction may be in a low power state (e.g. clocks off, power off, etc.). In a multi-threaded embodiment of the processor, there may be multiple low power states for the resources dedicated to each active thread in the processor. The processor/execution core may remain in the thread sleeping state 34 until a wakeup is signalled by the event control unit 16A or 16B (arc 36), in which case instruction execution for the thread may be resumed at the instruction following the wait for event instruction.

Figure 4:
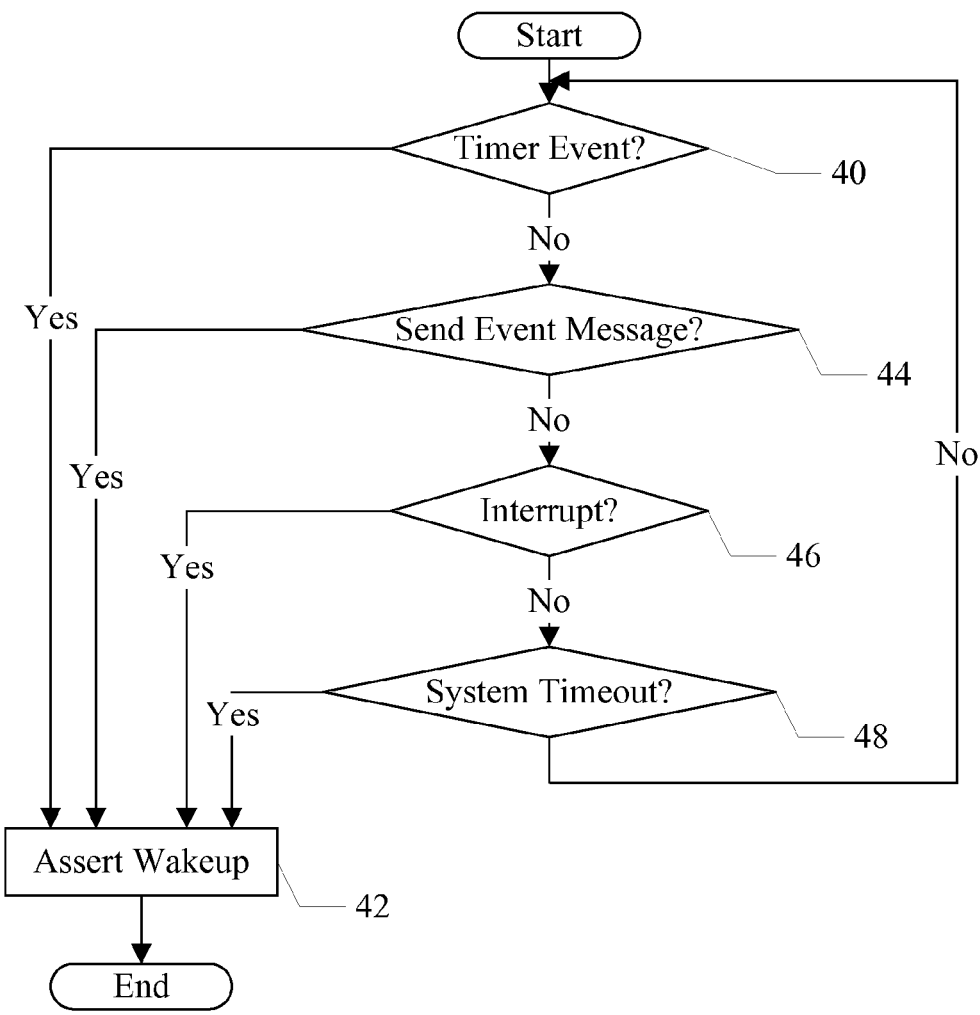
FIG. 4 is a flowchart illustrating operation of one embodiment of an event control unit shown in FIG. 1 or 2.

Turning next to FIG. 4, a flowchart is shown illustrating operation of one embodiment of an event control unit (e.g. the event control unit 16A or 16B). While the blocks are shown in a particular order for ease of understanding, other orders may be used. Additionally, blocks may be performed in parallel in combinatorial logic in the event control unit. Blocks, combinations of blocks, and/or the flowchart as a whole may be pipelined over multiple clock cycles.

The event control unit may detect a timer event signal by the timer unit 12 (decision block 40). If a timer event is detected (decision block 40, "yes" leg), the event control unit may assert the wakeup signal to the execution core (block 42). Additionally, in embodiments that implement the send event instruction described above, the event control unit may detect a send event message (decision block 44). If a send event message is received (decision block 44, "yes" leg), the event control unit may assert the wakeup signal (block 42). In some embodiments (e.g. a single threaded processor that stops its clocks and/or is powered down in the low power state), the receipt of an interrupt may cause a wakeup in order to service the interrupt in a timely fashion. If an interrupt is received (decision block 46, "yes" leg), the event control unit may assert the wakeup signal (block 42). In some embodiments, the system may include a system timeout timer (not shown) which may cause a wakeup. The system timeout may be presented to the processor in the form of an interrupt, and thus the system timeout may be a subset of the interrupt. For example, the system timeout may occur when a thread's execution granule has expired and a new thread is to be scheduled. If the system timeout interrupt occurs (decision block 48, "yes" leg), the event control unit may assert the wakeup signal (block 42).

In other embodiments, there may be additional events that cause the event control unit to assert the wakeup signal. The additional events may be included with a subset of the events shown in FIG. 4, in other embodiments. Any combination of events may be used. It is noted that, in one embodiment, the decision blocks 40, 44, 46, and 48 may be independent and thus may be performed in parallel or in any order.

Figures 5, 6:
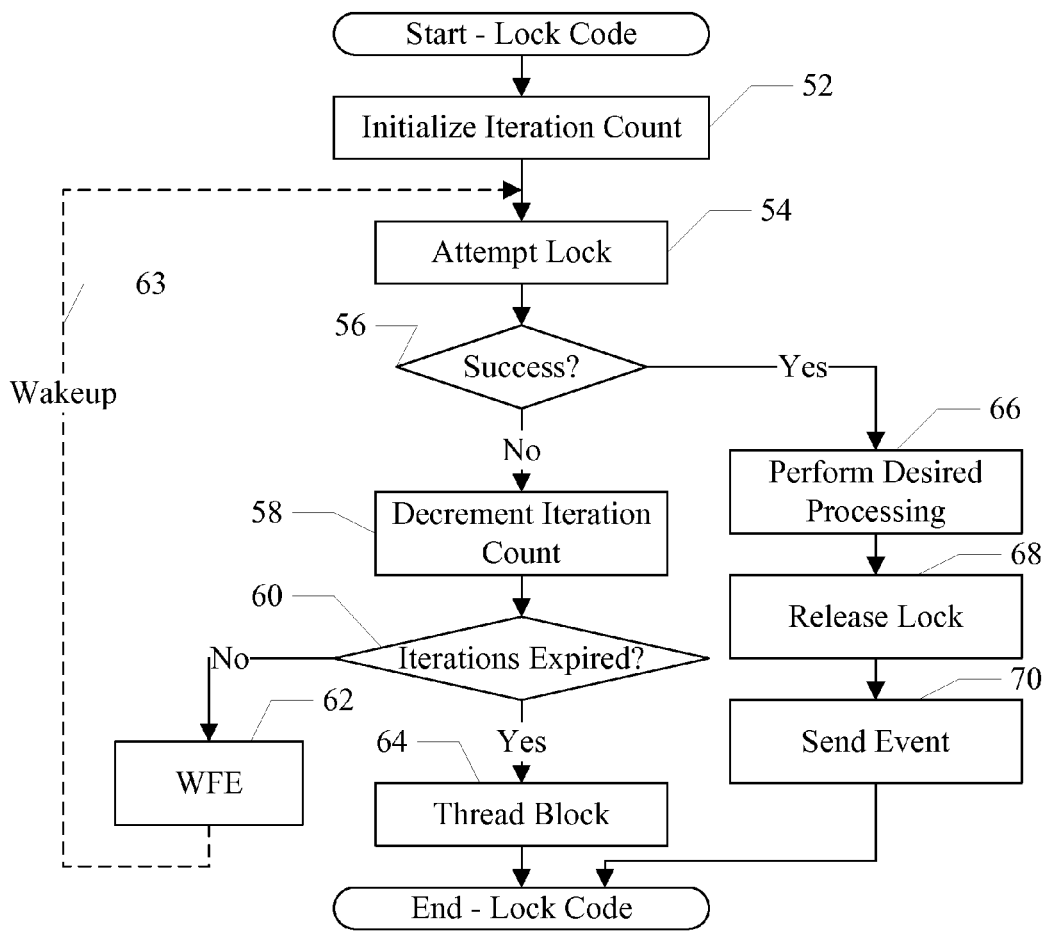
FIG. 5 is a flowchart illustrating a portion of one embodiment of initialization code.
FIG. 6 is a flowchart illustrating one embodiment of lock code.

Turning next to FIG. 5, a flowchart is shown illustrating a portion of one embodiment of initialization code that may be executed by a processor 10A or 10B during initialization of a system that includes the processor. While the blocks are shown in a particular order for ease of understanding, other orders may be used. The initialization code may comprise instructions that are executable by a processor to implement the operations shown.

The initialization code may initialize the timer unit or units (block 50) to signal the timer event at the desired wakeup interval. That is, the desired wakeup interval may be the selected time interval described above. The desired wakeup interval may be read from a non-volatile storage (e.g. a read-only memory, a flash memory, disk storage, etc.) that is included in the system. If the non-volatile storage is modifiable, the desired wakeup interval may be changed over time to better reflect actual lock holding times in a given system.

The initialization code may generally include other operations to prepare a system for use (e.g. to "boot" a system). In some cases, the desired wakeup interval may be modified/programmed at other points in time. For example, the desired wakeup interval may change depending on the workload of the system, the nature of the data protected by the locks, etc. Accordingly, in some embodiments, the timer units may be programmed dynamically during operation.

Turning now to FIG. 6, a flowchart is shown illustrating a portion of one embodiment of lock code that may be executed by a processor 10A or 10B to manage a lock. While the blocks are shown in a particular order for ease of understanding, other orders may be used. The lock code may comprise instructions that are executable by a processor to implement the operations shown. In an embodiment, the lock code may be included in an application/thread that uses the lock. In another embodiment, the lock code may be part of an operating system and may exposed as an application program interface (API) for use by an application. Alternatively, portions of the flowchart may be implemented in the operating system and may be APIs.

The lock code may initialize an iteration count, which may be the maximum number of unsuccessful iterations of attempting to acquire the lock before the thread blocks (block 52). The iteration count multiplied by the selected time interval may be approximately equal to the typical lock hold time (e.g. within the granularity available to the timer unit 12), or somewhat longer than the typical lock hold time.

The lock code may then attempt to acquire the lock (block 54). Generally, acquiring the lock may refer to the operations performed to determine that the lock is in a state that permits the code to take control of the lock, and the operations to change the state of the lock to exclude other code from taking control. Code that has acquired a lock may subsequently release the lock, which may include changing the state of the lock back to the state indicating that the lock is available to be acquired. The states of the lock and their interpretation may vary based on the type of lock. A simple lock may be a bit which is clear to indicate acquirable and set to indicate not acquirable (or currently held), or vice versa. A lock may be zero to indicate acquirable, and non-zero values may indicate currently held and may identify the holder (e.g. by thread identifier, process identifier, etc.). Other locks may include different states of accessibility (e.g. read-only versus read/write or no access).

If the lock is not successfully acquired (decision block 56, "no" leg), the lock code may decrement the iteration count (block 58), and determine if the number of iterations have expired (decision block 60). If not (decision block 60, "no" leg), the lock code may execute the wait for event instruction (block 62). The thread may be stalled in the low power state until a wakeup event is detected by the processor (e.g. the timer event—dotted line 63), at which time the lock may be attempted again. For example, the lock code may include the wait for event instruction followed by a branch instruction to the first instruction of one or more instructions that attempt to acquire the lock (block 54). If the wakeup event is an interrupt, the next instruction may be an interrupt handler. Whether or not the interrupt handler returns to the wait for event instruction, the following instruction, or neither is implementation dependent. On the other hand, if the number of iterations has expired (decision block 60, "yes" leg), the thread may block (block 64). Blocking a thread may include, e.g., descheduling the thread and inhibiting rescheduling of the thread until the reason for blocking is cleared. For example, in an embodiment, a thread may call an API of the operating system to block itself, and may indicate the reason for block (e.g. waiting on the lock that it is attempting to acquire, in this case). Alternatively, the operating system may block the thread (e.g. if the lock code, or the portion that includes checking the iteration count, is part of the operating system). The operating system may support a variety of other reasons for a thread block.

If the lock is successfully acquired (decision block 56, "yes" leg), the thread may perform the desired processing that is permitted via acquiring the lock (block 66). The thread may then release the lock (block 68). In embodiments that implement the send event instruction, the thread may optionally include the send event instruction (block 70). The send event instruction is optional because the waiting thread(s) will wakeup at the next timer event. Sending the event may simply speed the process.

It is noted that, in some embodiments, successfully acquiring the lock may cause the lock code to return to an application with an indication that the lock has been acquired. Blocks 66, 68, and 70 may not be part of the lock code in such an embodiment. Blocks 68 and 70 may be part of a release lock API, in some embodiments. It is further noted that other embodiments may eliminate the iteration count and may instead use a timer service provided by the operating system to read the time at the start of the lock code (e.g. in place of block 52) and which may read the time again after each failure to acquire the lock. The difference between the current time and the initial time may be compared to the typical lock hold time to determine if execution of the wait for event instruction or thread block is the response to the failure to acquire the lock.

Figure 7:
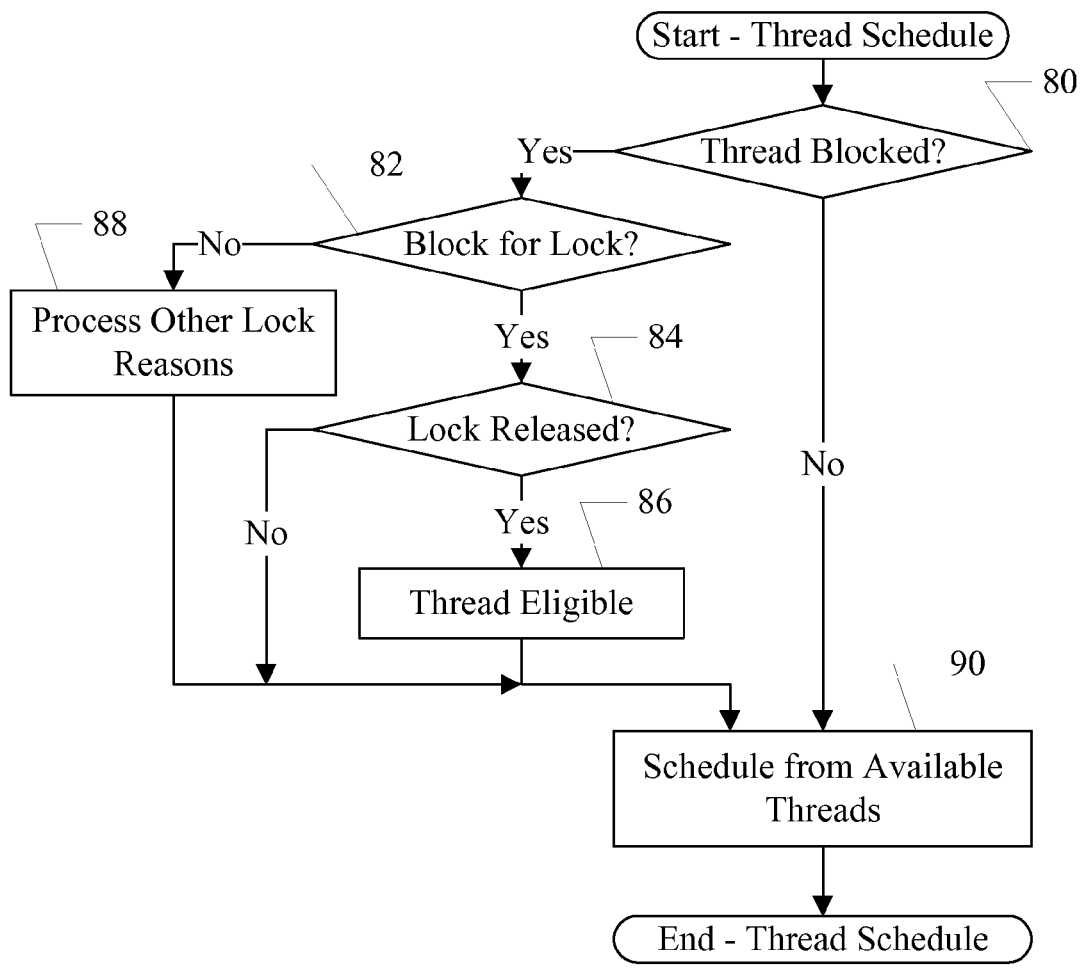
FIG. 7 is a flowchart illustrating operation of one embodiment of a thread scheduler.

Turning now to FIG. 7, a flowchart is shown illustrating operation of one embodiment of a thread scheduler that may schedule threads for execution on processors such as the processors 10A-10B. While the blocks are shown in a particular order for ease of understanding, other orders may be used. The thread scheduler may comprise instructions that are executable by a processor to implement the operations shown. The thread scheduler may be part of the operating system, for example.

The thread scheduler may examine each thread. If a thread is blocked (decision block 80, "yes" leg), the thread scheduler may check the reason for the block. If the block is for a particular lock (decision block 82, "yes" leg), the thread scheduler may determine if the lock has been released (decision block 84). For example, the thread scheduler may read the state of the lock and examine the state to determine if it has been released. If so (decision block 84, "yes" leg), the thread scheduler may mark the thread as eligible for scheduling (block 86). Otherwise (decision block 84, "no" leg), the thread may remain unavailable. If the thread is blocked for a reason other than waiting on a lock (decision block 82, "no" leg), the thread scheduler may process the other block reasons and mark the thread available or not available based on the results (block 88).

The thread scheduler may then examine the threads that are available for scheduling, and schedule the threads for execution (block 90).

Figure 8:
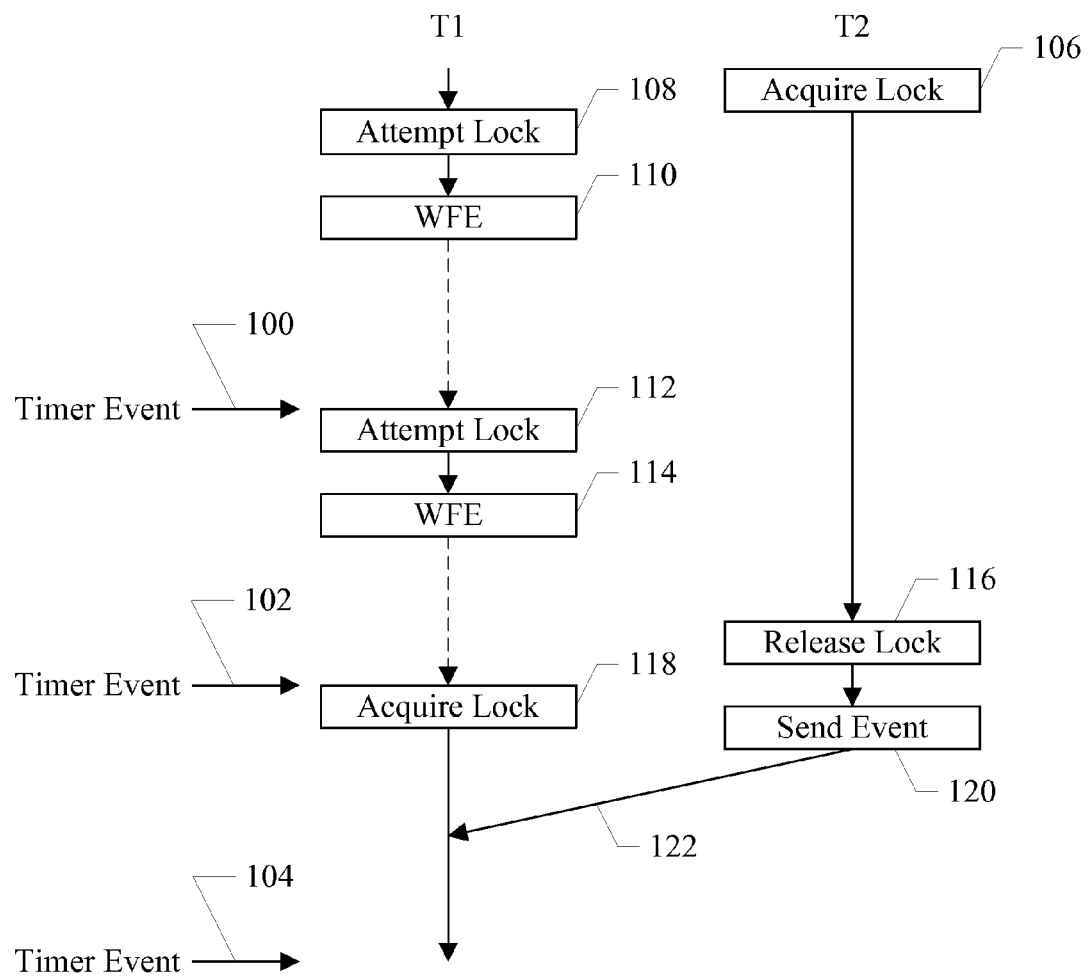
FIG. 8 is a timing diagram illustrating a first example of the lock code.
Figure 9:
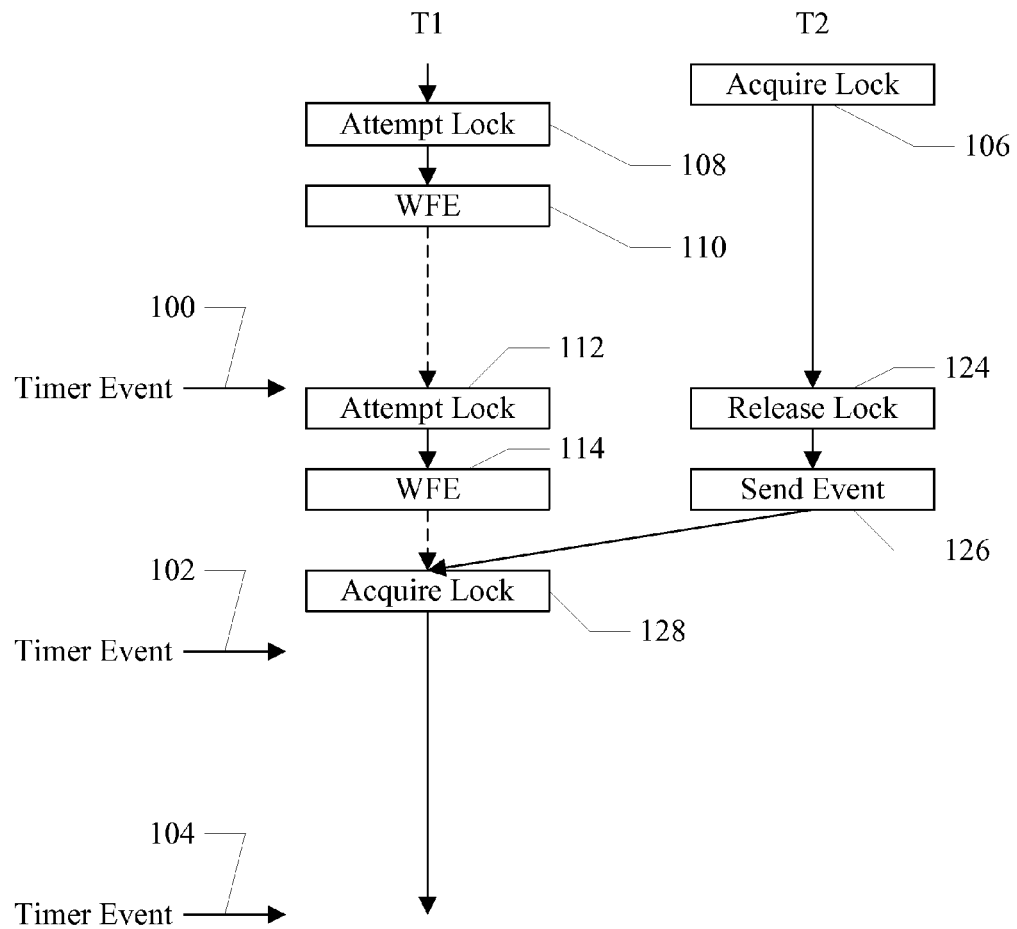
FIG. 9 is a timing diagram illustrating a second example of the lock code.
Figure 10:
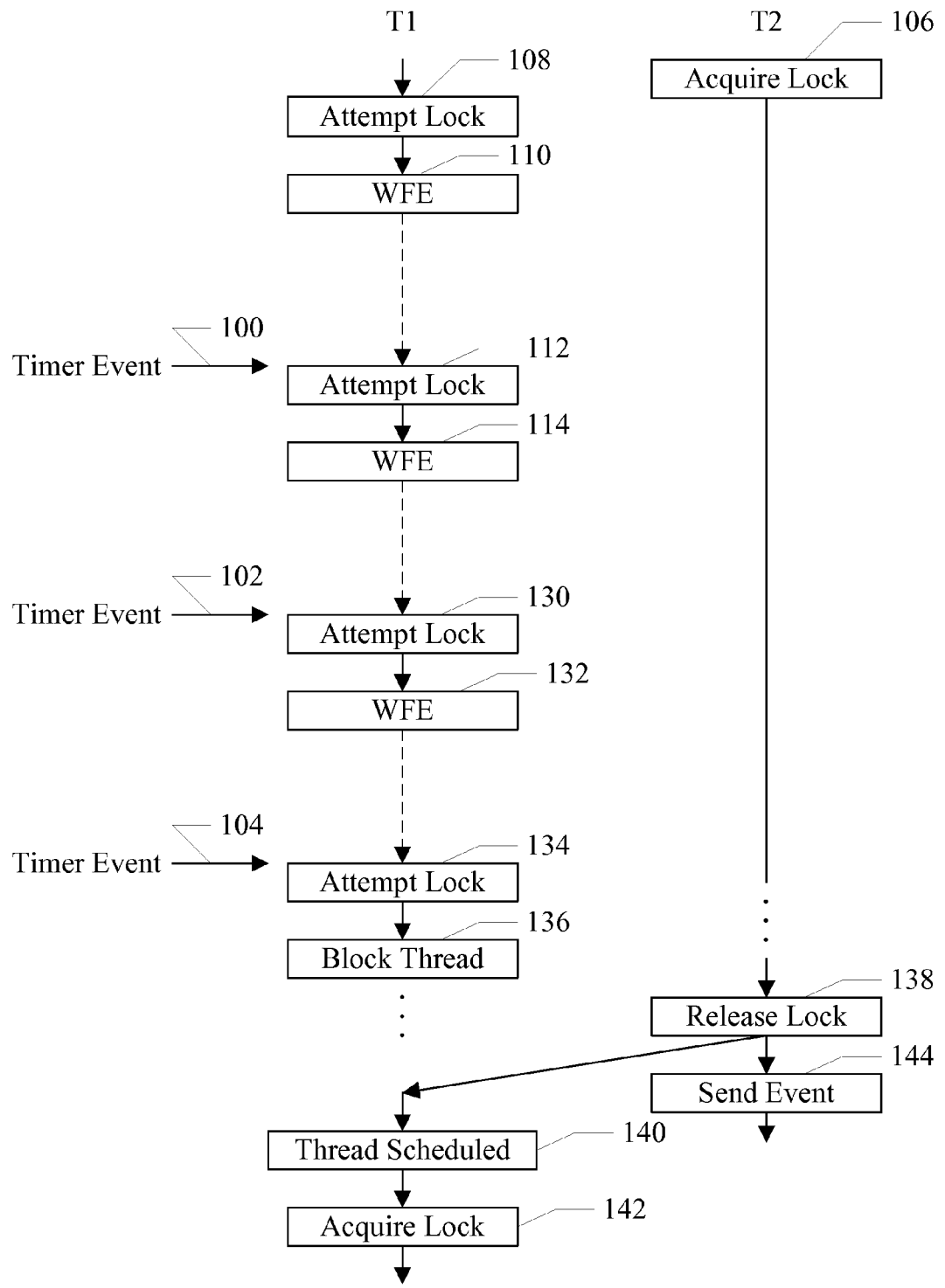
FIG. 10 is a timing diagram illustrating a third example of the lock code.

Turning now to FIGS. 8-10, timing diagrams of various examples of threads acquiring locks are shown. Two threads are shown, labeled T1 and T2 at the top of the figure. Time increases in the downward direction in the figures. In each figure, three timer events are shown at arrows 100, 102, and 104. Solid lines between activities indicate thread execution, and dotted lines indicate a low power state for the thread.

FIG. 8 illustrates a first example of a thread acquiring a lock. In the example, the thread T2 acquires the lock (reference numeral 106), and the thread T1 attempts to acquire the lock after the thread T2 acquires it (reference numeral 108). Since thread T2 has the lock, the thread T1 fails in its attempt to acquire the lock and executes the wait for event instruction (reference numeral 110). The processor remains in the low power state for the thread T1 until the first timer event (arrow 100) occurs. It is noted that the execution of the wait for event instruction is not synchronized to the timer unit 12, and thus the amount of time spent in the low power state may vary within the limit of the selected time interval.

In response to the timer event (arrow 100), the processor wakes up for the thread T1 and the thread T1 attempts to acquire the lock again (reference numeral 112). The thread T2 is still processing as permitted by the lock, and has not yet released it. Accordingly, the thread T1 fails to obtain the lock, and executes the wait for event instruction again (reference numeral 114). While the thread T1 is in the low power state, the thread T2 completes its processing and releases the lock (reference numeral 116).

In response to the second timer event (arrow 102), the thread T1 wakes up and successfully acquires the recently released lock (reference numeral 118). In this example, the thread T2 includes the send event instruction and transmits the send event message (reference numeral 120). However, in this case, the thread T2 has acquired the lock prior to the send event message arriving (arrow 122). Other embodiments may not implement the send event message.

FIG. 9 illustrates a second example of a thread acquiring a lock. Similar to the first example, the thread T2 acquires the lock (reference numeral 106) and the thread T1 subsequently attempts to acquire the lock and executes the wait for event instruction in response to failing to acquire the lock (reference numerals 108 and 110). The thread T1 is in the low power state until the first timer event (arrow 100), after which the thread T1 wakes up, attempts to acquire the lock (reference numeral 112), and executes the wait for event instruction (reference numeral 114).

In this example, the thread T2 releases the lock shortly after the thread T1 attempts and fails to acquire the lock (reference numeral 124) and transmits the send event message (block 126). The thread T1 wakes up in response to the send event message, and the thread T1 acquires the lock prior to the second timer event at arrow 102 (reference numeral 128). The example of FIG. 9 illustrates how the use of the optional send event message may reduce latency in the lock handoff. Within the send event message in this example, the thread T1 would not acquire the lock until after the timer event at arrow 102.

FIG. 10 illustrates a third example of a thread acquiring a lock. Similar to the first example, the thread T2 acquires the lock (reference numeral 106) and the thread T1 subsequently attempts to acquire the lock and executes the wait for event instruction in response to failing to acquire the lock (reference numerals 108 and 110). The thread T1 is in the low power state until the first timer event (arrow 100), after which the thread T1 wakes up, attempts to acquire the lock (reference numeral 112), and executes the wait for event instruction (reference numeral 114).

In this example, the thread T2 holds the lock for longer than the typical lock hold time. Accordingly, at the second timer event (arrow 102), the thread T1 again attempts to acquire the lock and fails, executing the wait for event instruction (reference numerals 130 and 132). At the third timer event (arrow 104), the thread T1 attempts to acquire the lock and fails (reference numeral 134). However, at this point in the example, the number of iterations has been exceeded and the thread blocks (reference numeral 136). The processor resources that were dedicated to the thread may be assigned to another thread.

At some point, the thread T2 completes its processing and releases the lock (reference numeral 138). The thread scheduler may detect that the lock is free, make thread T1 eligible for scheduling, and schedules the thread T1 (reference numeral 140). The thread T1 may then successfully acquire the lock (reference numeral 142). Accordingly, between the time that the last iteration was attempted (and the thread blocked) and the time that the thread is scheduled again, the processor resources assigned to the thread may be put to productive use doing other work (or may be put into a reduced power mode indefinitely). Any power expended during the time period may be more wisely used than if the thread T1 were continuing to wake up but fail to acquire the lock.

It is noted that, while the thread T2 is shown as transmitting the send event message (reference numeral 144). However, in this example, the send event message has no effect. Even if the send event message arrive at the processor to which the thread T1 is ultimately scheduled and acquires the lock (reference numerals 140 and 142), the send event message would not have any acceleration effect on the thread T1 acquiring the lock because the thread T1 is not in the low power state from the wait for event instruction and that point.

Figure 11:
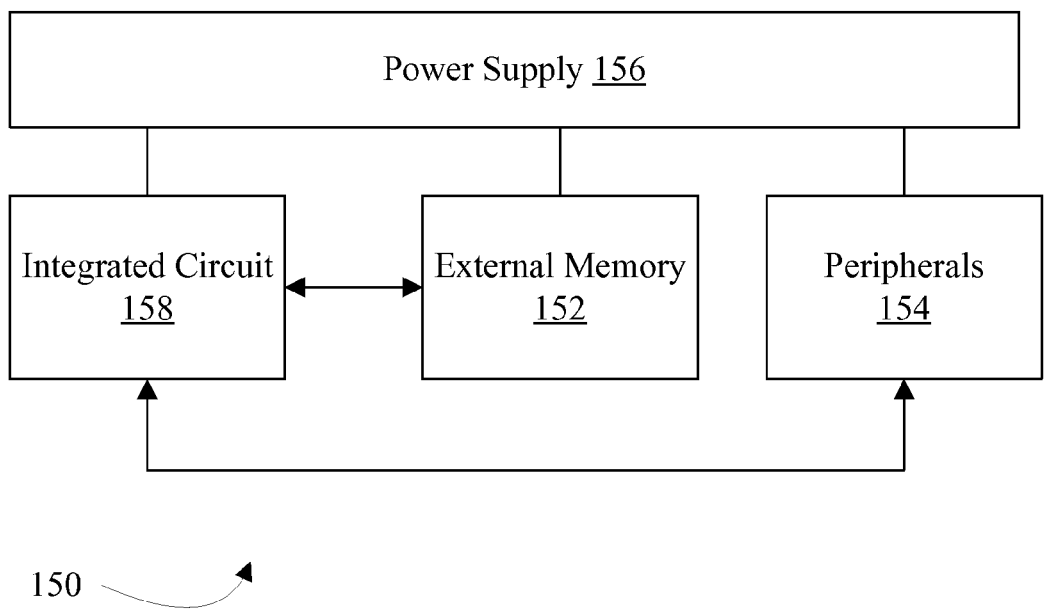
FIG. 11 is a block diagram of one embodiment of a system.

Turning next to FIG. 11, a block diagram of one embodiment of a system 150 is shown. In the illustrated embodiment, the system 150 includes at least one instance of and integrated circuit 158 coupled to one or more peripherals 124 and an external memory 122. A power supply 156 is also provided which supplies the supply voltages to the integrated circuit 158 as well as one or more supply voltages to the memory 112 and/or the peripherals 114. In some embodiments, more than one instance of the integrated circuit 158 may be included.

The integrated circuit 158 may include one or more processors such as processors 10A-10B, and one or more timer units such as timer unit 12 (or timer units 12A-12B integrated into the processors).

The external memory 152 may be any desired memory. For example, the memory may include dynamic random access memory (DRAM), static RAM (SRAM), flash memory, or combinations thereof. The DRAM may include synchronous DRAM (SDRAM), double data rate (DDR) SDRAM, DDR2 SDRAM, DDR3 SDRAM, etc.

The peripherals 154 may include any desired circuitry, depending on the type of system 150. For example, in one embodiment, the system 150 may be a mobile device and the peripherals 154 may include devices for various types of wireless communication, such as wifi, Bluetooth, cellular, global position system, etc. The peripherals 154 may also include additional storage, including RAM storage, solid state storage, or disk storage. The peripherals 154 may include user interface devices such as a display screen, including touch display screens or multitouch display screens, keyboard or other keys, microphones, speakers, etc.

Figure 12:
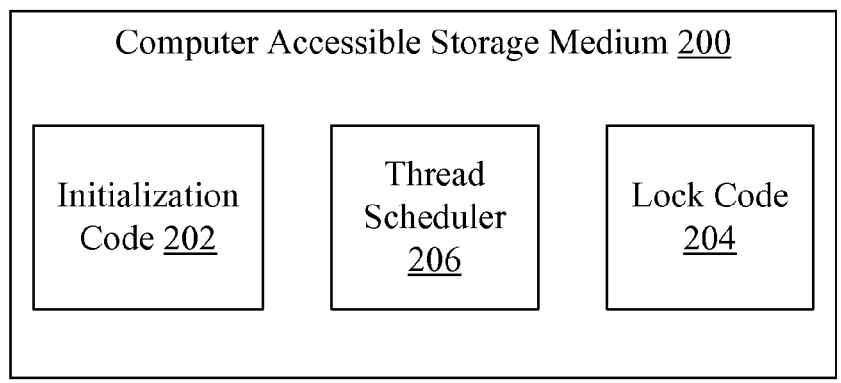
FIG. 12 is a block diagram of one embodiment of a computer storage accessible medium.

Turning now to FIG. 12, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link. The computer accessible storage medium 200 in FIG. 12 may store one or more of initialization code 202, lock code 204, and/or thread scheduler code 206. The initialization code 202 may comprise instructions which, when executed, may implement the flowchart of FIG. 5. The lock code 204 may comprise instructions which, when executed, implement any part of the flowchart of FIG. 6. The thread scheduler 206 may comprise instructions which, when executed, implement any part of the flowchart of FIG. 7. Generally, the computer accessible storage medium 200 may store any set of instructions which, when executed, implement a portion or all of the flowcharts shown in FIGS. 5, 6, and 7. A carrier medium may include computer accessible storage media as well as transmission media such as wired or wireless transmission.

Figure 13:
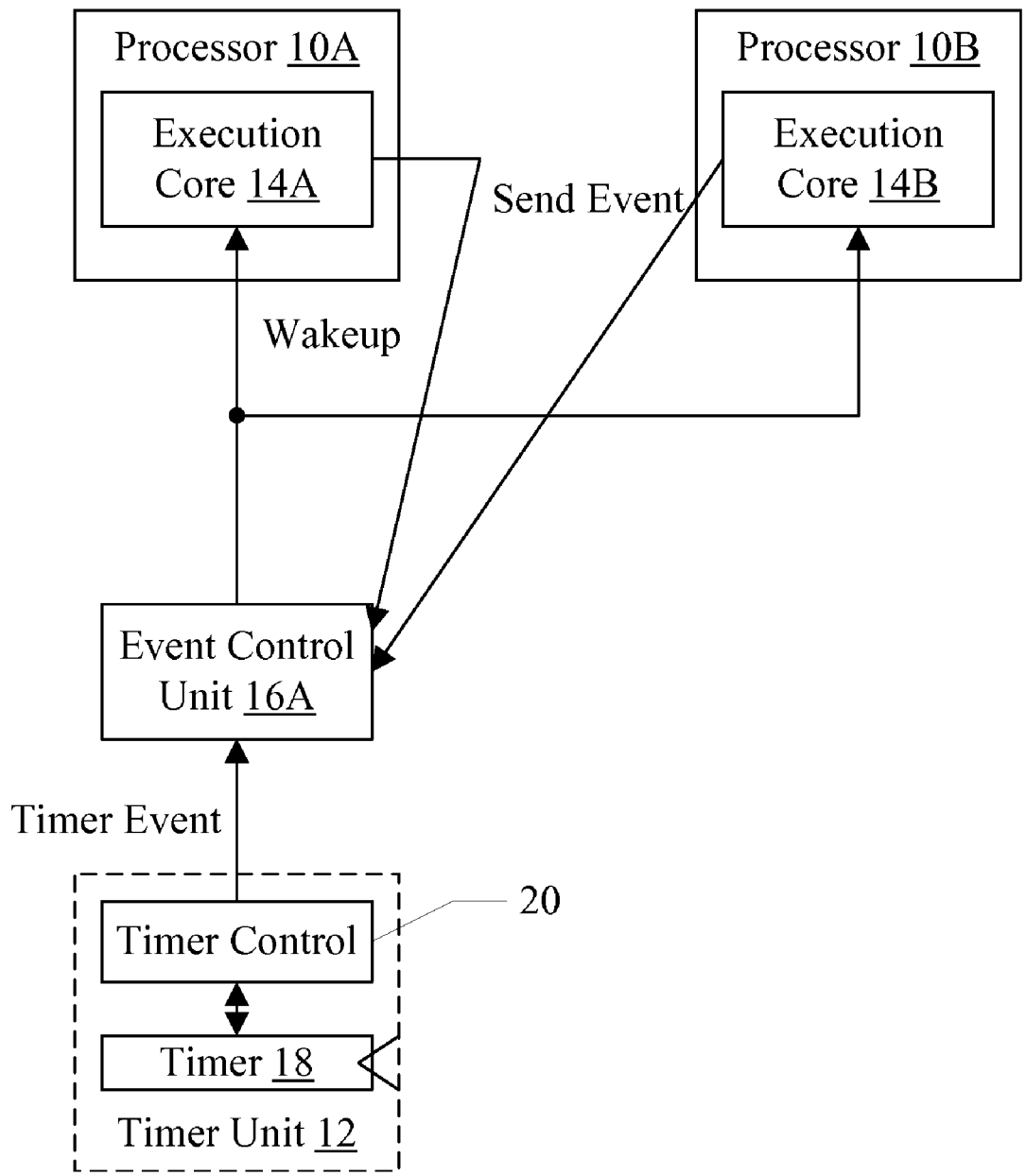
FIG. 13 is a block diagram of another embodiment of a portion of a system including one or more processors, an event control unit, and a timer unit.

Turning now to FIG. 13, a block diagram of another embodiment of a portion of a system including the timer unit 12, an event control unit 16A coupled to receive a timer event from the timer unit 12, and processors 10A-10B including execution cores 14A-14B coupled to receive a wakeup event from the event control unit 16A. The execution cores 14A-14B are further configured to transmit a send event indication to the event control unit 16A. In the embodiment of FIG. 13, one or more processors 10A-10B share an event control unit 16A and the corresponding wakeup event, and thus may each wakeup in response to the shared wakeup events. In some embodiments, all of the processors in a system may share the event control unit 16A/wakeup event, and any indications that the wakeup event should occur (e.g. send event indications, timers, interrupts, etc.) may be sent to the shared event control unit 16A. Other embodiments may include more than one event control unit 16A, and each event control unit 16A may be shared by two or more processors within the system.

Numerous variations and modifications will become apparent to those skilled in the art once the above disclosure is fully appreciated. It is intended that the following claims be interpreted to embrace all such variations and modifications.

What is claimed is:

1. A method comprising:
    a processor attempting to acquire a lock for a thread being executed;
    responsive to failing to acquire the lock, determining that at least one additional iteration of attempting to acquire the lock is permitted for the thread, wherein the determining is responsive to an iteration count that is updated in response to each iteration of attempting to acquire the lock, wherein the iteration count indicates a number of permitted iterations of attempting to acquire the lock;
    responsive to determining that the additional iteration is permitted, waiting for an event prior to initiating another iteration, wherein waiting for the event causes the processor to enter a low power state, reducing power consumption; and
    responsive to determining that the additional iteration is permitted, permitting the thread to remain scheduled on the processor.

2. The method as recited in claim 1 further comprising:
    the processor detecting the event;
    the processor exiting the low power state; and
    the processor performing the additional iteration.

3. The method as recited in claim 2 wherein the performing the additional iteration comprises:
   the processor attempting to acquire a lock for the thread;
   responsive to acquiring the lock, the processor performing processing on a resource controlled by the lock; and
   responsive to completing the processing, the processor releasing the lock.

4. A method comprising:
   a processor attempting to acquire a lock for a thread being executed;
   responsive to failing to acquire the lock, determining that at least one additional iteration of attempting to acquire the lock is permitted for the thread;
   responsive to determining that the additional iteration is permitted, waiting for an event prior to initiating another iteration, wherein waiting for the event causes the processor to enter a low power state, reducing power consumption;
   responsive to determining that the additional iteration is permitted, permitting the thread to remain scheduled on the processor;
   the processor detecting the event;
   the processor exiting the low power state; and
   the processor performing the additional iteration, wherein the performing the additional iteration comprises:
      the processor attempting to acquire the lock for the thread;
      responsive to failing to acquire the lock, determining that yet another iteration of attempting to acquire the lock is not permitted for the thread; and
      descheduling the thread.

5. The method as recited in claim 4 further comprising:
   a thread scheduler detecting that the thread is descheduled waiting for the lock;
   the thread scheduler detecting that the lock is released; and
   the thread scheduler marking the thread as eligible to schedule responsive to detecting that the lock is released.

6. A computer accessible storage medium storing a plurality of instructions which, when executed by a processor, cause the processor to:
   attempt to acquire a lock for a thread being executed;
   responsive to failing to acquire the lock, determine that a reattempt to acquire the lock is permitted for the thread responsive to an iteration count that is updated in response to each iteration of attempting to acquire the lock, wherein the iteration count indicates a number of permitted iterations of attempting to acquire the lock;
   responsive to determining that the reattempt is permitted, wait for an event prior to initiating the reattempt, wherein the waiting causes the processor to enter a low power state; and
   responsive to determining that the reattempt is permitted, leave the thread scheduled on the processor.

7. The computer accessible storage medium as recited in claim 6 wherein the plurality of instructions include instructions executed in response to the processor detecting the event and exiting the lower power state, the instructions causing the processor to perform the reattempt.

8. The computer accessible storage medium as recited in claim 7 wherein the instructions which, when executed, perform the reattempt comprise instructions which, when executed:
   attempt to acquire a lock for the thread;
   responsive to acquiring the lock, perform processing on a resource controlled by the lock; and
   responsive to completing the processing, release the lock.

9. A computer accessible storage medium storing a plurality of instructions which, when executed by a processor, cause the processor to:
   attempt to acquire a lock for a thread being executed;
   responsive to failing to acquire the lock, determine that a reattempt to acquire the lock is permitted for the thread;
   responsive to determining that the reattempt is permitted, wait for an event prior to initiating the reattempt, wherein the waiting causes the processor to enter a low power state;
   responsive to determining that the reattempt is permitted, leave the thread scheduled on the processor;
   wherein the plurality of instructions include instructions executed in response to the processor detecting the event and exiting the lower power state, the instructions causing the processor to perform the reattempt, and wherein the instructions which, when executed, perform the reattempt comprise instructions which, when executed:
      attempt to acquire the lock for the thread;
      responsive to failing to acquire the lock, determine that yet another reattempt is not permitted for the thread; and
      block the thread.

10. The computer accessible storage medium as recited in claim 8 further comprising a thread scheduler, and wherein the thread scheduler is executable on the processor to:
    detect that the thread is blocked waiting for the lock;
    detect that the lock is released; and
    mark the thread as eligible to schedule responsive to detecting that the lock is released.

11. A method comprising:
    performing a plurality of iterations of:
       attempting to acquire a lock for a thread; and
       waiting for an event responsive to failing to acquire the lock, wherein waiting for the event causes the processor to enter a low power state, reducing power consumption;
    subsequent to performing the plurality of iterations without acquiring the lock, descheduling the thread.

12. The method as recited in claim 11 further comprising the processor exiting the low power state responsive to the event, wherein the event occurs in response to the expiration of a predetermined time period, and wherein a number of the plurality of iterations multiplied by the predetermined time period is approximately an amount of time that the lock is expected to be held for processing of a resource associated with the lock.

13. The method as recited in claim 11 wherein each of the plurality of iterations further comprises:
    updating an iteration count; and
    testing the iteration count for expiration, wherein expiration of the iteration count indicates that the plurality of iterations are complete.

14. The method as recited in claim 11 further comprising:
    during thread scheduling, detecting that the thread is descheduled waiting for the lock;
    detecting that the lock is released; and
    rescheduling the thread.

15. The method as recited in claim 14 further comprising, responsive to the rescheduling:
    performing the plurality of iterations of:
       attempting to acquire the lock for the thread; and
       waiting for the event responsive to failing to acquire the lock, wherein waiting for the event causes the processor to enter the low power state, reducing power consumption;

subsequent to performing the plurality of iterations without acquiring the lock, descheduling the thread again.

16. The method as recited in claim 14 further comprising, responsive to the rescheduling:
   acquiring the lock; and
   performing processing on a resource, wherein access to the resource is controlled by the lock.

17. A computer accessible storage medium storing a plurality of instructions which, when executed by a processor, cause the processor to:
   perform a plurality of iterations of:
      attempting to acquire a lock for a thread; and
      waiting for an event responsive to failing to acquire the lock, wherein waiting for the event causes the processor to enter a low power state, reducing power consumption;
   subsequent to performing the plurality of iterations without acquiring the lock, block the thread.

18. The computer accessible storage medium as recited in claim 17 further comprising the processor exiting the low power state responsive to the event, wherein the event occurs in response to the expiration of a predetermined time period, and wherein a number of iterations multiplied by the predetermined time period is approximately an amount of time that the lock is expected to be held.

19. The computer accessible storage medium as recited in claim 17 wherein the instructions executed during each of the plurality of iterations include instructions which, when executed by the processor, cause the processor to:
   update an iteration count; and
   test the iteration count for expiration, wherein the expiration of the iteration count indicates that the plurality of iterations are complete.

20. The computer accessible storage medium as recited in claim 17 further comprising a thread scheduler which, when executed:
   detects that the thread is blocked waiting for the lock;
   detects that the lock is released; and
   reschedules the thread.

* * * * *